(12) United States Patent
Wo

(10) Patent No.: US 11,774,323 B1
(45) Date of Patent: Oct. 3, 2023

(54) SYSTEM AND METHOD FOR CREATING A COLLIMATED SPACE FOR A HIGH FIDELITY SIMULATOR

(71) Applicant: DHPC Technologies, Inc., Woodbridge, NJ (US)

(72) Inventor: Yei Wo, East Brunswick, NJ (US)

(73) Assignee: DHPC Technologies, Inc., Woodbridge, NJ (US)

( * ) Notice: Subject to any disclaimer, the term of this patent is extended or adjusted under 35 U.S.C. 154(b) by 294 days.

(21) Appl. No.: 17/212,348

(22) Filed: Mar. 25, 2021

(51) Int. Cl.
*G01M 11/04* (2006.01)
*F41G 7/00* (2006.01)

(52) U.S. Cl.
CPC .............. *G01M 11/04* (2013.01); *F41G 7/004* (2013.01)

(58) Field of Classification Search
CPC .... F41G 7/004; G01M 11/0221; G01M 11/04
See application file for complete search history.

(56) References Cited

U.S. PATENT DOCUMENTS

| | | | |
|---|---|---|---|
| 2,042,174 A | 5/1936 | Foisy | |
| 3,263,561 A | 8/1966 | Jackson | |
| 3,292,491 A | 12/1966 | Jules | |
| 3,508,056 A | 4/1970 | Fricke | |
| 3,557,470 A | 1/1971 | Emerick et al. | |
| 3,603,726 A | 9/1971 | Garber et al. | |
| 3,738,168 A | 6/1973 | Mansell | |
| 3,748,751 A | 7/1973 | Breglia et al. | |
| 3,784,742 A | 1/1974 | Burnham et al. | |
| 3,811,204 A | 5/1974 | Marshall et al. | |
| 3,838,856 A | 10/1974 | Takeya et al. | |
| 3,904,204 A | 9/1975 | Yokoi | |
| 3,939,706 A | 2/1976 | Pinson | |
| 3,945,133 A | 3/1976 | Mohon et al. | |
| 4,037,470 A | 7/1977 | Mock et al. | |
| 4,137,651 A | 2/1979 | Pardes et al. | |

(Continued)

FOREIGN PATENT DOCUMENTS

CN 104655111 A 1/2017

OTHER PUBLICATIONS

DE 202012100037 U1 "Device For Local Heating Of The Skin", Feb. 14, 2012 (Year: 2012).*

(Continued)

*Primary Examiner* — Sang H Nguyen
(74) *Attorney, Agent, or Firm* — LaMorte & Associates, P.C.

(57) ABSTRACT

A system, method, and device for simulating an IR signature to test an IR detection device. At least one infrared LED display is provided. Each infrared LED display contains infrared LEDs that emit the desired IR signature. A reflector reflects the IR signature toward the IR detection device. The configuration of the reflector is dependent upon the configuration of the infrared LED display and whether or not some intermediate lens system is used. The IR signature is collimated as it travels to the IR detection device. The IR signature can be collimated by the reflector or by an added lens system. The IR signature fills the field of view associated with the IR detection system. The IR signature comes from a computer-controlled display. As such, the system can simulate various IR signatures and move those IR signatures throughout the field of view of the IR detection system.

10 Claims, 5 Drawing Sheets

(56) References Cited

U.S. PATENT DOCUMENTS

| | | | |
|---|---|---|---|
| 4,175,748 A | 11/1979 | Yokoi | |
| 4,223,454 A | 9/1980 | Mohon et al. | |
| 4,229,009 A | 10/1980 | Ohta | |
| 4,321,824 A | 3/1982 | Martin | |
| 4,440,506 A | 4/1984 | Eitel | |
| 4,618,771 A * | 10/1986 | Farren | G01N 21/37 250/343 |
| 4,657,511 A | 4/1987 | Allard et al. | |
| 4,797,555 A | 1/1989 | Le Mar | |
| 4,824,374 A | 4/1989 | Hendry et al. | |
| 5,161,013 A * | 11/1992 | Rylander | G09G 3/002 348/739 |
| 5,175,575 A | 12/1992 | Gersuk | |
| 5,194,006 A | 3/1993 | Zaenglein, Jr. | |
| 5,376,980 A | 12/1994 | Gersuk et al. | |
| 5,638,208 A | 6/1997 | Walker | |
| 5,850,225 A | 12/1998 | Cosman | |
| 6,176,584 B1 | 1/2001 | Best et al. | |
| 6,942,486 B2 | 9/2005 | Lvovskiy | |
| 8,185,350 B2 | 5/2012 | Deriso, Jr. et al. | |
| 8,441,625 B2 | 5/2013 | Wick, Jr. | |
| 8,794,967 B2 | 8/2014 | Sargent | |
| 8,988,674 B2 | 3/2015 | Anikitchev et al. | |
| 9,042,694 B2 | 5/2015 | Silny et al. | |
| 10,527,920 B1 | 1/2020 | Wo et al. | |
| 2003/0180692 A1 | 9/2003 | Skala et al. | |
| 2007/0254266 A1 | 11/2007 | Galanis et al. | |
| 2008/0206720 A1 | 8/2008 | Nelson | |
| 2010/0240015 A1 | 9/2010 | Chung et al. | |
| 2011/0207089 A1 | 8/2011 | Lagettie et al. | |
| 2012/0183931 A1 | 7/2012 | Galanis et al. | |
| 2013/0040268 A1 | 2/2013 | Van der Walt et al. | |
| 2013/0308183 A1 | 11/2013 | Vermeirsch et al. | |

OTHER PUBLICATIONS

Toshihiko et al. "Infrared Projector for Vehicle", Jun. 24, 2010, JP2010137729S (Year: 2010).*

Joachim et al. "Headlamp With Integrated Lidar", Nov. 15, 2018, DE102017109905 A1 (Year: 2018).*

Roland et al. "Lighting Device I.e. Head Light, For Electric Bicycle, Has Vertically Adjustable Diaphragm Partially Switched Into Optical Path Between Reflector And Lens, Where Major Axis Of Reflector Diagonally Lies On Optical Axis Of Lens", Jan. 17, 2013, DE 102011079093 A1 (Year: 2013).*

Kazuo "Display Unit", Aug. 22, 2019, JP 2019139076A (Year: 2019).*

Min et al. "Multi Optical Axies Arrange Inspection Device And Axies Arranging Method Thereof", Aug. 18, 2014, KR 20140100771A (Year: 2014).*

Hoon et al "Large Scale Interactive Display System Based Multi Touch and Method of the Same", Oct. 8, 2010, KR 20100109420A (Year: 2010).*

John M. Stewart et al., 'Correlated UV Through IR Signature Modeling of Targets and Backgrounds' Georgia Institute of Technology , Nov. 1998, 11 pages (Year: 1998).

David M. Krum et al., 'Augmented Reality Using Personal Projection and Retroreflection', University of Southern California, Jan. 1, 2012, 21 pages (Year: 2012).

H.S. Lowry et al., 'Development of HWIL Testing Capabilities for Satellite Target Emulation at AEDC', Arnold Engineering Development Center (AEDC), 2006, 10 pgs (Year: 2006).

\* cited by examiner

SYSTEM AND METHOD FOR CREATING A COLLIMATED SPACE FOR A HIGH FIDELITY SIMULATOR

BACKGROUND OF THE INVENTION

1. Field of the Invention

In general, the present invention relates to test simulators that simulate the infrared signature of various objects for the purpose of calibrating and testing infrared (IR) signal detection equipment. More particularly, the present invention relates to simulators that are designed to reproduce both the infrared signatures of selected objects and the background IR signal clutter that would be present in a real-world application.

2. Prior Art Description

There are many systems that are designed to identity and track the infrared (IR) signature of various objects. Such systems are widely used in the military to track a variety of weapon platforms and active weapon systems. For example, certain missiles track targets by following a selected IR signature. IR detection systems are also used by aircraft to identify hidden vehicles, people and weapon systems. In order to develop, test, and improve various IR detection systems for use in the field, the IR detection systems must be exposed to repeated testing. Different objects produce different IR signatures. The IR signatures differ in size, shape, intensity, duration and wavelength. If the IR detection system is intended to track or identify various vehicles, weapon platforms, and/or weapons systems, then real-world testing would require the operation of those vehicles, weapon platforms, and/or weapons systems. This course of testing is both highly expensive and inconvenient. Accordingly, testing IR detection systems using real-world objects often proves to be too expensive and problematic to be practical.

Many of the problems associated with using a real-world object can be removed by simulating the IR signature of the object. Such a simulation involves irradiating the IR detection system being tested with a test IR signal that has the appropriate intensity, and the appropriate temporal, spatial, and spectral characteristics needed to mimic a real-world object. This type of testing is typically referred to as Hardware-in-the-Loop (HITL) testing. However, IR emitters cannot just be pointed at the IR detection system. In the real world, the object being tracked often moves relative to the IR detection system. Accordingly, in order to accurately simulate a real-world object, a simulated emission signature must be able to traverse a large field of view.

Furthermore, in the real word, a moving object moves through a complex background of IR noise or clutter. This background clutter changes greatly depending upon circumstances. For example, an aircraft tracked from below may have an easily detectable IR signature as silhouetted against a cold night sky. However, that same aircraft tracked from above can easily be lost when silhouetted against the IR background of a populated urban area or active battlefield.

One of the few practical ways to simulate a spectral emission across a large field of view is to project the simulated emission onto a screen. The screen is then used to fill the field of view of a detection system. Prior art systems that project light of various frequencies onto a screen to simulate some aspects of a weapon system are exemplified by the applicant's earlier disclosure of U.S. Pat. No. 10,527,920 to Wo et al. However, such systems are not well adapted to the present need. When light is projected onto a screen, only a small fraction of that light is reflected back from any point on the screen to an observer. As such, in order for a few points on a screen to reflect back the IR profile of a real weapon and realistic background clutter, multiple expensive projectors would have to be used.

Accordingly, a need exists for creating a simulator that can accurately simulate the IR signature of different objects and different background clutter profiles, without requiring complex and expensive projection equipment. This need is met by the present invention as described and claimed below.

SUMMARY OF THE INVENTION

The present invention is a system, method, and device for simulating an IR signature of an object for the purpose of testing an IR detection device. The IR detection device is the device under test. The IR detection device is mounted in a testing position, where its line of sight and field of view are known. To simulate an IR signature of a selected object at least one infrared LED display is provided. Each infrared LED display contains infrared LEDs that can be selectively controlled to emit the desired IR signature.

A reflector is positioned to reflect the IR signature from the infrared LED display toward the testing position of the IR detection device. The configuration of the reflector is dependent upon the configuration of the infrared LED display and whether or not some intermediate lens system is used. The IR signature is collimated as it travels from the infrared LED display to the IR detection device. The IR signature can be collimated by the reflector or by an added lens system used between the reflector and the infrared LED display.

The IR signature fills the field of view associated with the IR detection system. The IR signature comes from a computer-controlled display. As such, the system can simulate various IR signatures and move those IR signatures throughout the field of view of the IR detection system.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

The present invention system, method and device can be used to test, calibrate and otherwise develop a variety of specialty cameras and sensor arrays that are purposed for detecting the infrared (IR) emission signature of a targeted object. The camera system or sensor array being tested is herein referred to as the Device Under Test (DUT) in the following description. The present invention simulates the IR signature of various objects, such as weapon platforms and weapon systems. These IR signatures are directed toward the DUT to test, calibrate, or otherwise develop the DUT. Four exemplary embodiments of the present invention system are illustrated and described. These embodiments are selected in order to set forth some of the best modes contemplated for the invention. The illustrated embodiments, however, are merely exemplary and should not be considered limitations when interpreting the scope of the appended claims.

Figure 1:
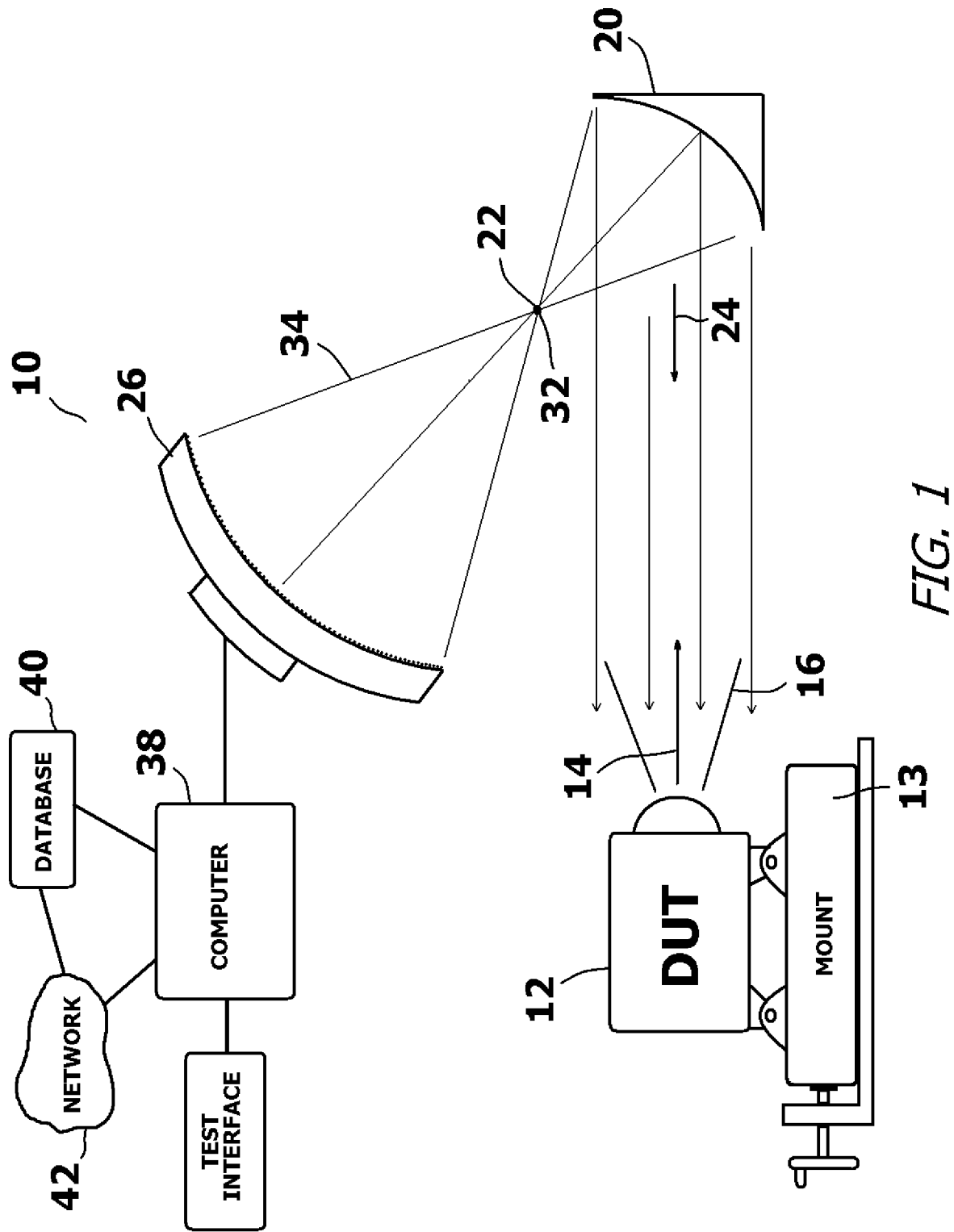
FIG. 1 is a schematic showing the hardware requirements of an exemplary embodiment of the present invention.

Referring to FIG. 1, the hardware requirements of the present invention IR simulation system 10 are shown. The IR simulation system 10 can simulate both an IR signature of a target object and some background IR clutter for detection by a DUT 12. As previously explained, the DUT 12 can be any existing IR detection system under development or in need of calibration. Accordingly, the DUT 12 is primarily an optical system that is designed to locate and/or identify and IR source by analyzing the characteristics (intensity, temporal, spatial, spectral) of an IR signature, as seen from afar. The DUT 12 can come in a variety of shapes and sizes, depending upon how it is deployed. For instance, if the DUT 12 is a sensor array from a tank or a helicopter, it is going to be larger and more complex than a DUT 12 used by a weapons system that is carried by a soldier in the field.

To test the DUT 12 using a simulation, the DUT 12 is set in a mount 13 in a testing position where it can observe a simulation. Accordingly, the DUT 12 is mounted at a first location. In its testing position, the DUT 12 has a primary line of sight 14 and a field of view 16. An off-axis parabolic reflector 20 is provided. The off-axis parabolic reflector 20 is specially coated to efficiently reflect the frequencies of infrared light. The off-axis parabolic reflector 20 has a refection focal point 22 and a central ray axis 24. Due to the parabolic shape of the reflector 20, any IR radiation originating at the reflection focal point 22 is reflected as collimated light that travels parallel to the central ray axis 24. Conversely, any IR radiation that travels parallel to the central ray axis 24 is reflected and focused to the reflection focal point 22.

The off-axis parabolic reflector 20 is positioned so that the central ray axis 24 of the off-axis parabolic reflector 20 aligns with the primary line of sight 14 for the DUT 12. Furthermore, the off-axis parabolic reflector 20 is sized and positioned so that it occupies the effective field of view 16 of the DUT 12.

Figure 2:
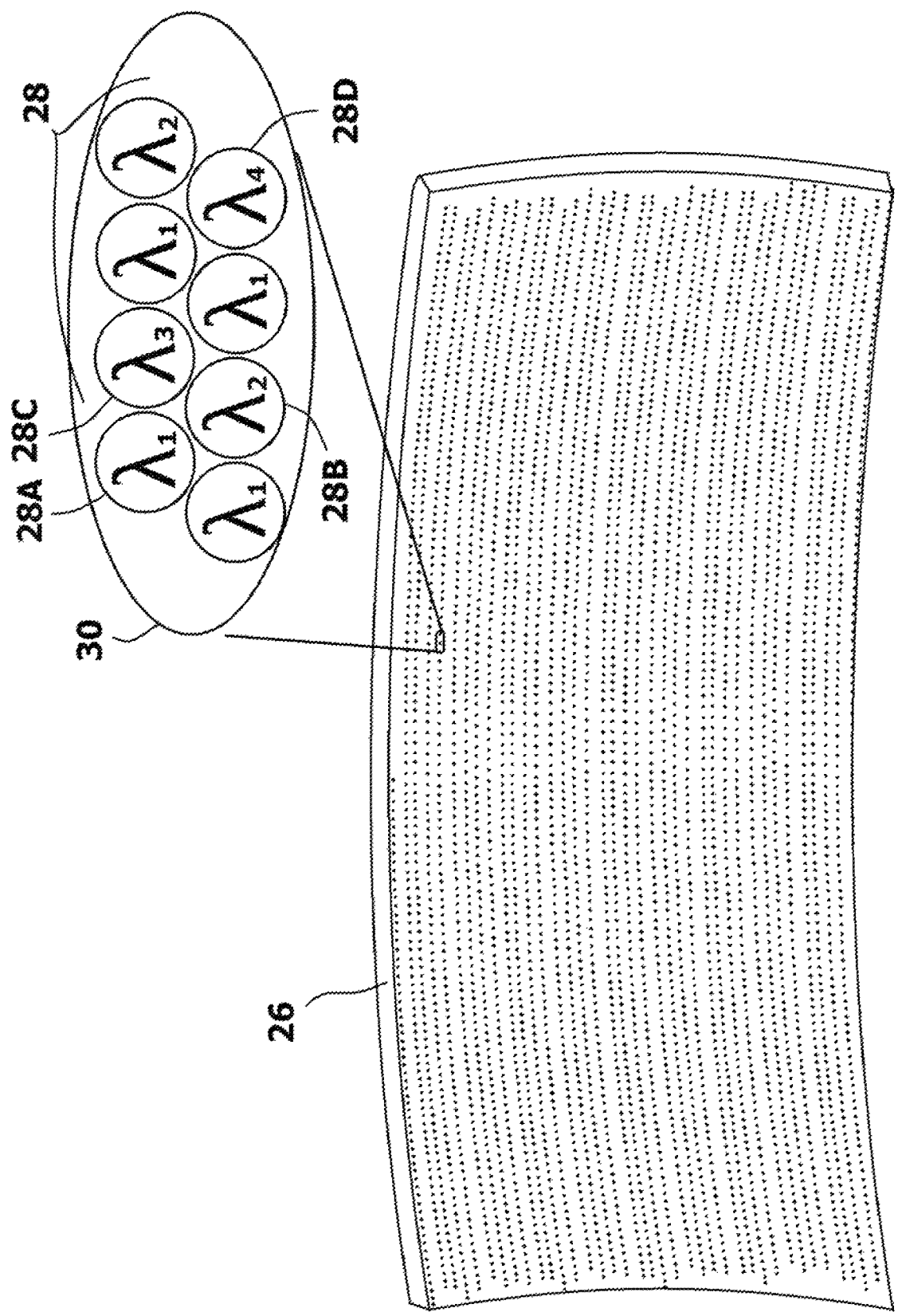
FIG. 2 shows details of an exemplary embodiment of an IR band LED display.

An IR band LED display 26 is provided. Referring to FIG. 2 in conjunction with FIG. 1, it can be seen that the IR band LED display 26 is an LED display that only contains infrared LEDs 28. Although all the infrared LEDs 28 in the IR band LED display 26 emit infrared light, the infrared LEDs 28 are varied within pixel clusters 30. Within the pixel clusters 30 are different LEDs 28A, 28B, 28C, 28D that emit different wavelengths of infrared light across a selected section or sections of the IR spectrum. For example, many military grade IR detection systems primarily detect a section of the mid-wavelength IR band between the frequencies of 3.7 µm and 4.3 µm. In order to test such a detection system, the IR band LED display 26 selected for use in the IR simulation system 10, would need high resolution, i.e. LED density, in this range. As such, the repeating pixel clusters 30 would have a high density of LEDs that can emit radiation between the frequencies of 3.7 µm and 4.3 µm. Each pixel cluster 30 would also contain other infrared LEDs, at a lower resolution, that emit IR radiation in bands outside the selected range in order to simulate background clutter.

Referring back to FIG. 1 only, it can be seen that the illustrated IR band LED display 26 is curved. The curvature follows a spherical shape, therein providing the IR band LED display 26 with an image focal point 32. That is, all the infrared LEDs 28 contained within the IR band LED display 26 are pointed towards and are equidistant from the image focal point 32.

The IR band LED display 26 is arranged relative to the off-axis parabolic reflector 20 so that the image focal point 32 of the IR band LED display 26 aligns with the reflection focal point 22 of the off-axis parabolic reflector 20. The result is that all the IR radiation 34 emitted by the IR band LED display 26 is directed to the off-axis parabolic reflector 20 through the reflection focal point 22 of the off-axis parabolic reflector 20. As a consequence of the shape of the off-axis parabolic reflector 20, the IR radiation 34 is collimated and directed along the central ray axis 24 of the off-axis parabolic reflector 20. The central ray axis 24 of the off-axis parabolic reflector 20 is aligned with the primary line of sight 14 for the DUT 12. As a result, the IR radiation 34 is received by the DUT 12 as collimated light.

It is understood that different DUTs 12 come in different shapes and sizes. Furthermore, the field of view 16 for each DUT 12 may also differ. The DUT 12 is preferably set upon an adjustable mount 13 that enables the DUT to be adjusted in position and height. This enables the DUT 12 to be readily aligned with the off-axis parabolic reflector 20. Furthermore, the adjustable platform 38 enables the mounted distance between the off-axis parabolic reflector 20 and the DUT 12 to be adjusted. This adjustment enables the relative positions between the DUT 12 and the off-axis parabolic reflector 20 to be altered so that the off-axis parabolic reflector 20 fills the fields of view 16 for the DUT 12.

In the real world, a typical IR detection system would be used to detect an object from many miles away. As a result, the IR radiation reaching the IR detection system would effectively be collimated as it reaches the IR detection system. By collimating the simulated IR radiation 34 using the off-axis parabolic reflector 20, the IR simulation system 10 can simulate the IR radiation 34 from a distant IR source within the confines of a testing laboratory.

The IR band LED display 26 is capable of simulating various IR signatures. It will be understood that practically all of the IR radiation 34 emitted by the IR band LED display 26 is received by the DUT 12. The IR band LED display 26 fills the field of view 16 for the DUT 12. As such, the IR band LED display 26 can simulate an IR source that moves across the field of view 16 for the DUT 12. The IR band LED display 26 is operated by a computer 38. The computer 38 has access to a database 40 of IR signatures that correspond to various objects. The database 40 may be within the computer 38 or accessible by the computer 38 from another source, via a data network 42. Each IR signature may have a recorded profile (intensity, temporal, spectral) from an actual object, such as an enemy weapon platform. The database 40 can contain thousands of recordings of various objects at different distances and angles to the observer. Accordingly, when a particular IR signature is selected for display, it is played on the IR band LED display 26, wherein all of the selected objects IR radiation signature features of the selected objects are simulated. Accordingly, the DUT 12 can be tested, calibrated or otherwise developed without having to incur the expense and complex logistics of observing real-world objects.

Since the IR signature of various objects are being simulated, variations can be readily made to compensate for different atmospheric conditions. For example, in the real world there can be smoke and dust in the air. In addition, visibility may be diminished by rain or fog. All these conditions absorb or scatter IR radiation and can significantly alter the intensity of an IR signature prior to detection. Accordingly, the IR detection system 10 can alter the IR signatures to be consistent with losses due to environment.

The ability of the IR simulation system 10 to compensate for changing conditions also enables the IR simulation system 10 to compensate for system losses. When IR radiation 34 is projected toward the off-axis parabolic reflector 20, some of the IR radiation 34 is absorbed or otherwise dissipated. The off-axis parabolic reflector 20 has a set value for reflectivity. Reflectivity is the ratio of the power of the reflected signal to the power of the incoming signal. The amount of losses is often dependent upon the intensity and spectrum of the emission. The present invention simulation system 10 can automatically compensate for such losses. For example, suppose two percent (2%) of IR radiation 34 is lost by reflecting from the off-axis parabolic reflector 20. The IR simulation system 10 can increase the intensity of the IR radiation 34 to compensate for the losses so the IR radiation 34 received by the DUT 12 is highly accurate.

It will also be understood that the IR signatures themselves can be modeled simulations rather than actual recordings of real objects. If the IR signatures of a particular object are well known, so that the IR signature is known for any given distance and orientation, then a detection scenario can be simulated, and the appropriate IR signature added to the simulation.

Figure 3:
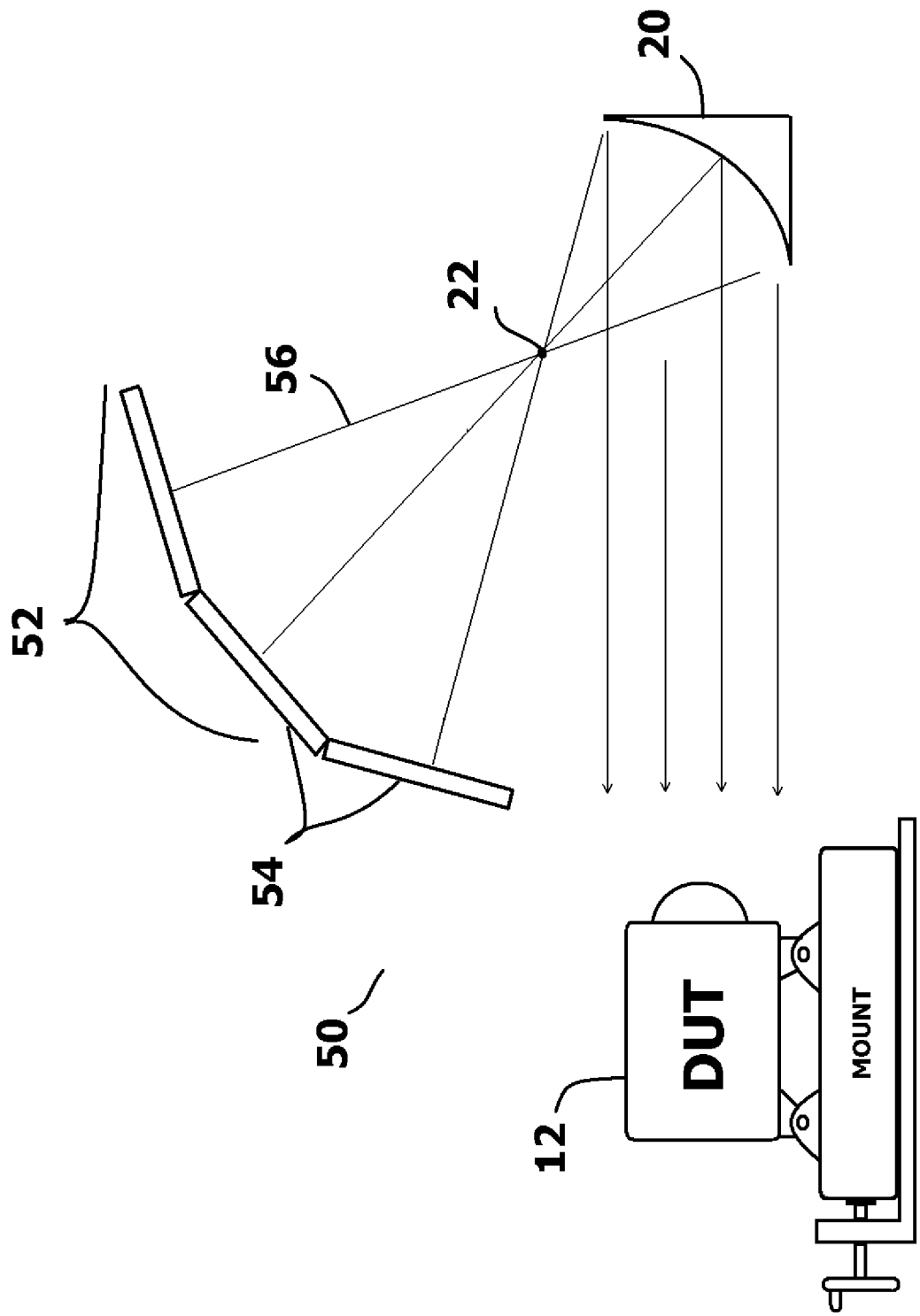
FIG. 3 illustrates an alternate embodiment of an IR simulation system that utilizes multiple IR LED displays.

In the embodiment of FIG. 1, the IR band LED display 26 is curved. This is a complexity that can increase the cost of the overall IR simulation system 10. Referring now to FIG. 3, an alternate embodiment of an IR simulator system 50 is shown that does not utilize a curved display. Rather, in this embodiment, an overall display 52 is created by integrating a plurality of flat IR displays 54. Each of the flat IR displays 54 is oriented toward the reflection focal point 22 of the off-axis parabolic reflector 20. Although not all the IR radiation 56 from each IR display 54 is directly focused to the reflection focal point 22, the mean IR radiation for each of the IR displays 54 is. This configuration can be made sensitive enough to test less sophisticated IR detection systems.

Figure 4:
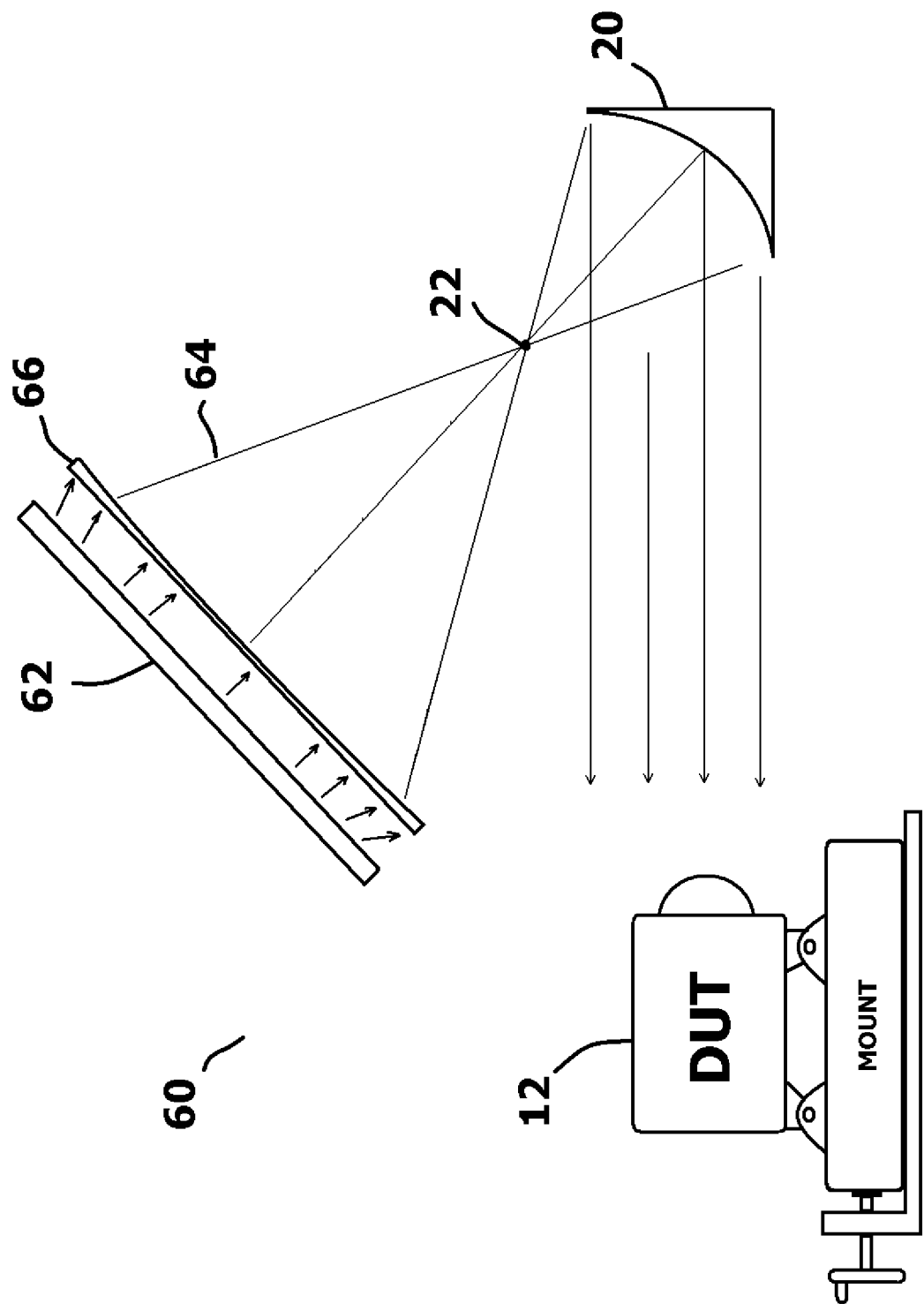
FIG. 4 illustrates an alternate embodiment of an IR simulation system that utilizes a flat IR LED display with a focusing lens system.

Referring to FIG. 4, a simpler variation of an IR simulation system 60 is shown. In this embodiment, only a single, flat IR LED display 62 is used to generate the IR radiation 64. The IR LED display 62 can be economically produced with ultra-high definition. To focus the IR radiation 64 toward the reflection focal point 22 of the off-axis parabolic reflector 20, a simple focusing lens system 66 can be used.

Figure 5:
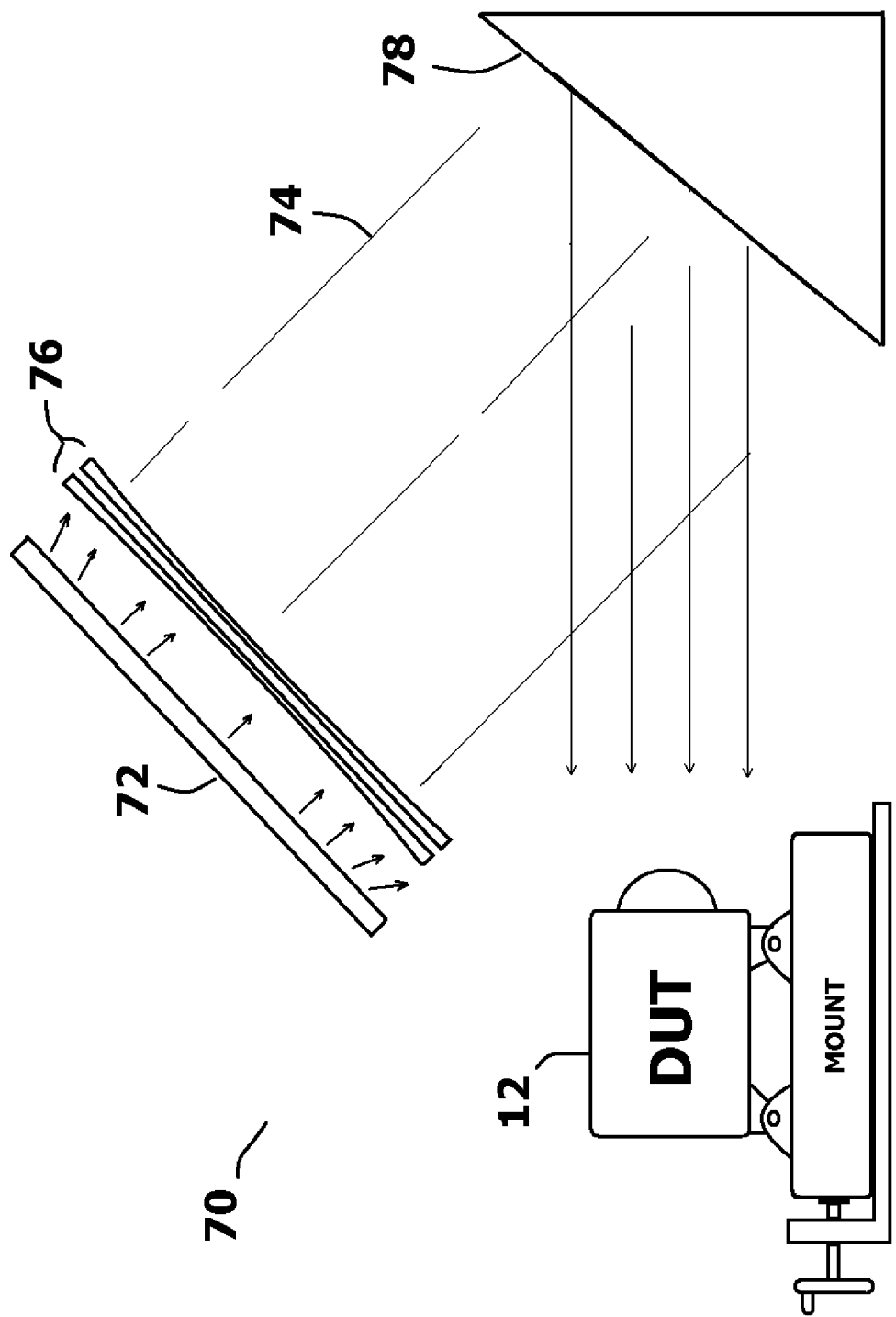
FIG. 5 illustrates an alternate embodiment of an IR simulation system that utilizes a flat IR LED display with a collimation lens system.

Referring to FIG. 5, another simple variation of an IR simulation system 70 is shown. In this embodiment, only a single, flat IR LED display 72 is used to generate the IR radiation 74. The IR LED display 72 can be economically produced with ultra-high definition. A collimation lens system 76 is placed in front of the IR LED display 72, wherein the collimation lens system 76 collimates the IR radiation 74 emitted by the IR LED display 72. Since the IR radiation 74 is collimated, there is no longer any need for an off-axis parabolic reflector. Rather, a simple flat reflector 78 can be used. The flat reflector 78 directs the IR radiation 74 toward the DUT 12.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. A system for simulating an infrared signature for the purpose of testing an IR detection device, wherein said IR detection device has a field of view, said system comprising:
   a parabolic reflector positioned and sized to fill said field of view of said IR detection device, wherein said parabolic reflector has a reflection focal point and wherein said parabolic reflector reflects infrared light passing through said reflection focal point into a collimated beam that is directed toward, and received by, said IR detection device; and
   an infrared LED display that contains only infrared LEDs, wherein said infrared LEDs are selectively controlled to emit said infrared signature, wherein said infrared signature is directed through said reflection focal point to said parabolic reflector.

2. The system according to claim 1, wherein said infrared LED display is curved to direct said infrared signature toward said reflection focal point.

3. The system according to claim 1, further including a lens system that focuses said IR signature toward a said reflection focal point.

4. A system for simulating an IR signature of an object for the purpose of testing an IR detection device with a given field of view, said system comprising:
   a mount for holding said IR detection device in a testing position;
   at least one infrared LED display that contains only infrared LEDs, wherein said infrared LEDs are selectively controlled to emit said IR signature; and
   a collimator positioned to collimate and direct said IR signature toward said testing position wherein said IR signature fills said field of view of said IR detection device, and wherein said collimator is a given distance from said testing position, wherein said collimator is a reflector that follows a parabolic curvature and has a reflection focal point that aligns with an emission focal point of said single curved display.

5. The system according to claim 4, wherein said given distance between said collimator and said testing position are selectively adjustable.

6. The system according to claim 4, wherein said at least one infrared LED display is a single curved display that has said emission focal point.

7. The system according to claim 4, wherein said at least one infrared LED display is a single flat display.

8. The system according to claim 4, wherein said at least one infrared LED display includes multiple flat displays that are directed toward a common emission focal point.

9. The system according to claim 7, wherein said collimator includes a lens system that collimates said IR signature emitted by said at least one infrared LED display.

10. A method of simulating an infrared signature for the purpose of testing an IR detection device with a field of view, said system comprising:
    providing an infrared LED display that contains only infrared LEDs;
    providing a reflector;
    selectively controlling said infrared LED display to emit said infrared signature; and
    directing said infrared signature toward said reflector, wherein said reflector collimates and reflects said infrared signature toward said IR detection device filling said field of view of said IR detection device with said infrared signature as a collimated signal.

* * * * *